United States Patent
Calta et al.

(10) Patent No.: US 10,564,039 B2
(45) Date of Patent: Feb. 18, 2020

(54) SYSTEM AND METHOD FOR PORTABLE MULTI-BAND BLACK BODY SIMULATOR

(71) Applicant: Lawrence Livermore National Security, LLC, Livermore, CA (US)

(72) Inventors: Nicholas Calta, Oakland, CA (US); Gabe Guss, Manteca, CA (US); Manyalibo Joseph Matthews, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 158 days.

(21) Appl. No.: 15/716,000

(22) Filed: Sep. 26, 2017

(65) Prior Publication Data

US 2019/0094076 A1     Mar. 28, 2019

(51) Int. Cl.
*G01J 5/08*     (2006.01)

(52) U.S. Cl.
CPC .................... *G01J 5/0803* (2013.01)

(58) Field of Classification Search
CPC ...... G01J 5/0803; G01J 5/0812; G01J 5/0818; G01J 5/084; G01J 5/0862; G01J 5/0896; G01J 5/52; G01J 5/522; G01J 2005/0048
See application file for complete search history.

(56) References Cited

U.S. PATENT DOCUMENTS

| | | |
|---|---|---|
| 2,815,276 A | 12/1957 | Raymond |
| 4,317,042 A | 2/1982 | Bartell |
| 4,641,227 A | 2/1987 | Kusuhara |
| 5,083,252 A * | 1/1992 | McGuire ............ F21V 9/40 362/293 |
| 5,408,101 A | 4/1995 | Wong |
| 5,756,992 A | 5/1998 | Spindler |
| 6,179,465 B1 * | 1/2001 | Yam .................. G01J 5/0003 250/252.1 |

(Continued)

FOREIGN PATENT DOCUMENTS

CN     106764691 A     5/2017

OTHER PUBLICATIONS

S.P. Mates, D. Basak, F.S. Biancaniello, S.D. Ridder, and J. Geist, "Calibration of a Two-Color Imaging Pyrometer and Its Use for Particle Measurements in Controlled Air Plasma Spray Experiments," J. Therm. Spray Technol., vol. 11, No. 2, pp. 195-205, Jun. 2002.

(Continued)

*Primary Examiner* — Lisa M Caputo
*Assistant Examiner* — Philip L Cotey
(74) *Attorney, Agent, or Firm* — Harness, Dickey & Pierce, PLC

(57) ABSTRACT

The present disclosure relates to an apparatus for simulating a black body spectrum. The apparatus makes use of a broadband light source and a light guide configured to receive light generated by the light source and to generate first and second optical signals. A first signal processing subsystem may be used to enable adjustment of both a signal spectrum and an intensity of the first optical signal. A second signal processing subsystem may be used to enable adjustment of both a signal spectrum and an intensity of the second optical signal. A beam cube may be used to combine the first and second optical signals to produce a final light output signal having a desired signal spectrum and a desired intensity.

21 Claims, 3 Drawing Sheets

(56) References Cited

U.S. PATENT DOCUMENTS

| | | | | |
|---|---|---|---|---|
| 6,525,814 B1* | 2/2003 | Hendrick, Jr. | ............ | G01J 3/10 356/328 |
| 9,091,151 B2* | 7/2015 | Jones | ............ | E21B 49/10 |
| 2009/0201498 A1* | 8/2009 | Raskar | ............ | G01J 3/02 356/310 |
| 2009/0296776 A1* | 12/2009 | Riza | ............ | G01J 5/0014 374/130 |
| 2010/0006761 A1* | 1/2010 | Johnson | ............ | G01J 3/02 250/343 |
| 2013/0265399 A1* | 10/2013 | Baranec | ............ | G02B 26/06 348/61 |
| 2013/0268096 A1* | 10/2013 | Riddle | ............ | G02B 26/06 700/9 |

OTHER PUBLICATIONS

B. Müller and U. Renz, "Development of a fast fiber-optic two-color pyrometer for the temperature measurement of surfaces with varying emissivities," Rev. Sci. Instrum., vol. 72, No. 8, pp. 3366-3374, Aug. 2001.

E. Rodriguez, J. Mireles, C.A. Terrazas, D. Espalin, M.A. Perez, and R.B. Wicker, "Approximation of absolute surface temperature measurements of powder bed fusion additive manufacturing technology using in situ infrared thermography," Addit. Manuf., vol. 5, pp. 31-39, Jan. 2015.

S.K. Everton, M. Hirsch, P. Stravroulakis, R.K. Leach, and A.T. Clare, "Review of in-situ process monitoring and in-situ metrology for metal additive manufacturing," Mater. Des., vol. 95, pp. 431-445, Apr. 2016.

T. Ueda, R. Nozaki, and A. Hosokawa, "Temperature Measurement of Cutting Edge in Drilling-Effect of Oil Mist," CIPR Ann. -Manuf. Technol., vol. 56, No. 1, pp. 93-96, 2007.

V.I, Sapritsky, "Blackbody Sources for the Range 100 K to 3500 K for Precision Measurements in Radiometry and Radiation Thermometry," 2003, vol. 684, pp. 619-624.

T.J. Quinn and C.R. Barber, "A Lamp as a Reproducible Source of near Black-Body Radiation for Precise Pyrometry up to 2700° C.," Metrologia, vol. 3, No. 1, pp. 19-23, Jan. 1967.

M. Musto, G. Rotondo, M. De Cesare, A. Del Vecchio, L. Savino, and F. De Filippis, "Error analysis on measurement temperature by means dual-color thermography techniques," Measurement, vol. 90, pp. 265-277, Aug. 2016.

* cited by examiner

SYSTEM AND METHOD FOR PORTABLE MULTI-BAND BLACK BODY SIMULATOR

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for simulating a black body signal spectrum, and more particularly to a system and method which enables user selection of an arbitrary temperature for the purpose of simulating a black body spectrum to enable accurate calibration of a camera system or pyrometer.

BACKGROUND

This section provides background information related to the present disclosure which is not necessarily prior art.

Thermal imaging techniques are used frequently to measure the temperature of hot objects, especially in situations where the object's temperature fluctuates rapidly or is too high for more straightforward, thermocouple-based methods. Thermal imaging, sometimes referred to pyrometry, relies on the inherent black body emission of hot objects, and depending on the wavelengths being monitored is often used to monitor temperatures between 500 K and 3000 K. Pyrometry is often used as a process monitoring technique in many industrial applications including additive manufacturing, metal processing such as refining, casting, and smelting, drilling, and related processes.

One common challenge associated with pyrometry is calibration over the appropriate temperature range. The most straightforward approach is to use a black body light source, usually a resistive furnace with a small aperture that allows the thermal emission to escape the black body cavity. Such sources produce a near-ideal black body spectrum over the entire electromagnetic spectrum. As such, they are ideal calibrants for thermal imagers or point pyrometers. However, such black body sources that operate above 1500° C. are very large, often up to 2 meters tall. Such black body sources are also time consuming to use, often taking a few hours to reach the intended temperature. For these reasons, they are not desirable and/or practical for most applications.

Another common solution for providing a black body spectrum is a well calibrated incandescent lamp. The amount of current supplied to the lamp is varied, and the temperature (and consequently the black body spectrum) of the lamp also changes. However, production of such specialty lamps is difficult and therefore suppliers are rare. Furthermore, these lamps do not produce a perfect black body spectrum due to absorptivity by glass components, changing spectral properties with age, and other inconsistencies.

The previously mentioned black body calibrant sources all rely on the generation of a true black body spectrum. An alternate approach is to produce a synthetic approximation of the black body spectrum using a broadband white light source and assorted filters. This is conceptually similar to the approach used by many solar simulator devices, which are primarily used to test the performance of photovoltaic cells. In the invention we claim here, we use multiple light sources and filters to generate a synthetic black body spectrum over two set wavelength ranges, suitable for calibrating a two-band thermal camera or two color pyrometer.

SUMMARY

This section provides a general summary of the disclosure, and is not a comprehensive disclosure of its full scope or all of its features.

In one aspect the present disclosure relates to an apparatus for simulating a black body. The apparatus makes use of a broadband light source and a light guide configured to receive light generated by the light source and to generate first and second optical signals. A first signal processing subsystem may be used to enable adjustment of both a signal spectrum and an intensity of the first optical signal. A second signal processing subsystem may be used to enable adjustment of both a signal spectrum and an intensity of the second optical signal. A beam cube may be used to combine the first and second optical signals to produce a final light output signal having a desired signal spectrum and a desired intensity.

In another aspect the present disclosure relates to a multi-band black body simulating apparatus. The apparatus may comprise a broadband light source and a light guide configured to receive light generated by the light source, for generating first and second optical signals. A first signal processing subsystem may be included for enabling adjustment of both a signal spectrum and an intensity of the first optical signal. The first signal processing subsystem may include a first bandpass filter and a first adjustable optical attenuator. A second signal processing subsystem may be included for enabling adjustment of both a signal spectrum and an intensity of the second light optical signal. The second signal processing subsystem may include a second bandpass filter and a second adjustable optical attenuator. The apparatus may further include a beam cube configured to combine the first and second optical signals received from the first and second signal processing subsystems to produce a final light output signal.

In still another aspect the present disclosure is directed to a method for simulating a black body. The method may comprise using a broadband light source to generate broadband light, and then using a light guide to receive the broadband light and to generate first and second optical signals. The method may further comprise using a first signal processing subsystem to receive the first optical signal and to enable user adjustment of both a signal spectrum and an intensity of the first optical signal. The method may further comprise using a second signal processing subsystem to receive the second optical signal and to enable adjustment of both a signal spectrum and an intensity of the second light optical signal. The method may further comprise using a beam cube configured to combine the first and second optical signals to produce a final light output signal having a desired signal spectrum and a desired intensity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure relates an optical system which in one embodiment forms a portable optical apparatus that uses filters to modulate a two-band region of the near infrared spectrum to simulate a black body spectrum. This apparatus can be set to simulate any arbitrary temperature between approximately 1000 K and 10,000 K, and functions as a reliable and accurate calibration method for a two band thermal camera system or pyrometer.

Figure 1:
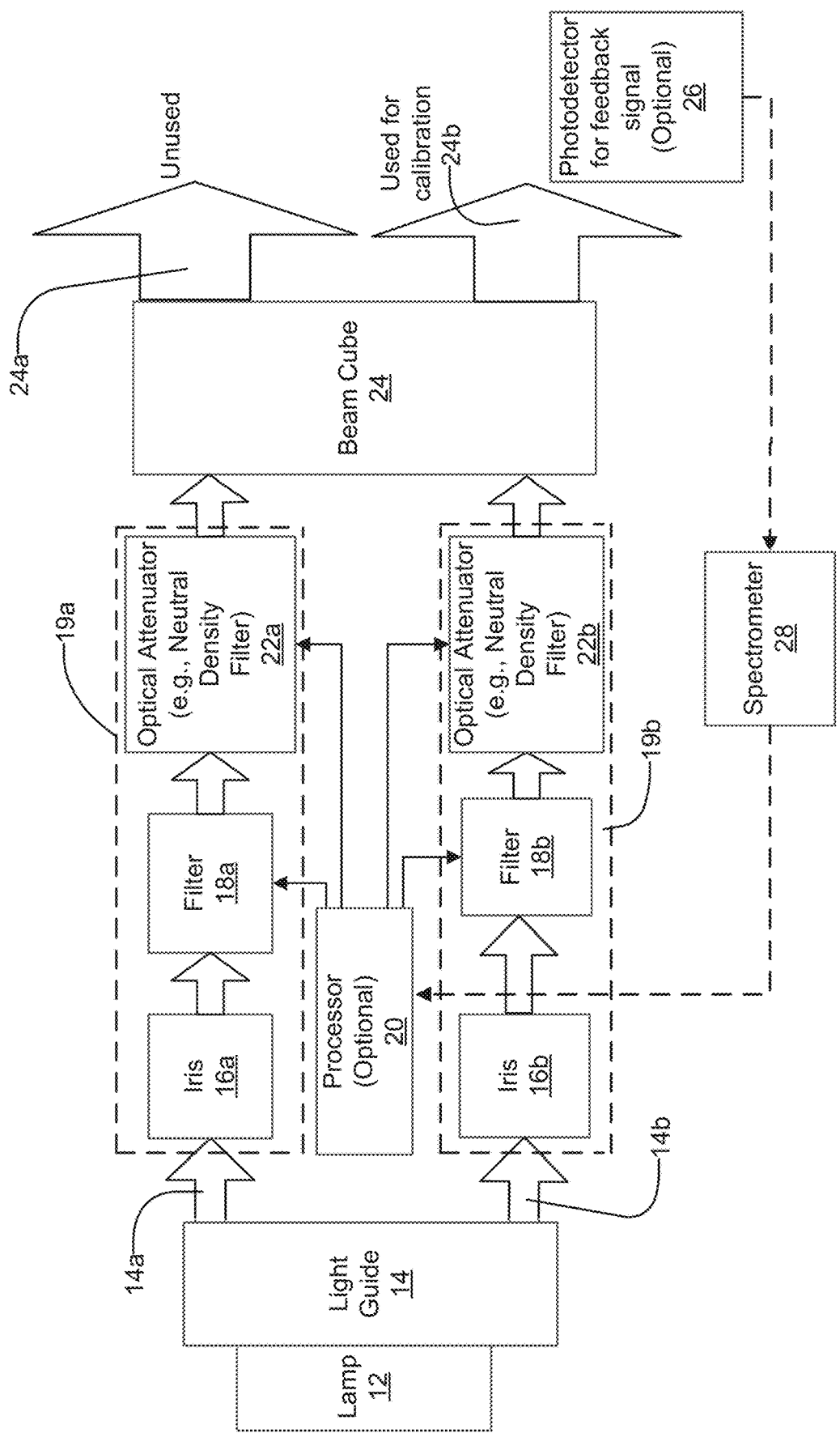
FIG. 1 is a high level block diagram of an apparatus in accordance with one embodiment of the present disclosure for simulating a black body signal spectrum.

Referring to FIG. 1, one embodiment of a portable two band black body simulator apparatus 10 (hereinafter simply "apparatus 10") is shown in accordance with the present disclosure. The apparatus 10 in this example may use a single broadband white light source, in this instance a quartz tungsten halogen lamp 12. This lamp 12 directs an optical input signal into an optical light guide, which in this example is a liquid light guide 14. The liquid light guide 14 carries first and second optical signals 14a and 14b that are approximately equal in intensity, and which may be directed through completely independent optical paths. The liquid light guide 14 is a component which is commercially available from various sources, for example Thorlabs, Inc. of Newton, N.J. The liquid light guide 14 may be mounted to any suitable support structure.

The optical signals 14a and 14b are each fed into an associated iris 16a and 16b. The irises 16a and 16b define the beam diameters of the optical signals 14a and 14b, respectively, so that the beam diameters are less than or equal to a preselected beam diameter. The optical signal outputs from each iris 16a and 16b are then fed into bandpass filters 18a and 18b, respectively, to define the spectral ranges over which the black body spectrum will be simulated. In one embodiment the bandpass filters 18a and 18b are modular filter wheels which may be manually adjusted by an individual to select specific frequency spectra. In another embodiment the bandpass filters 18a and 18b may be controlled electronically (i.e., in an automated fashion) by a suitable electronic controller or processor 20 having memory and input/output capabilities. Accordingly, the processor 20 also forms an optional component which may, in some implementations, be advantageous to incorporate. Manually adjustable modular filter wheels are also widely commercially available from many vendors.

The optical output signal from each bandpass filter 18a and 18b may then be fed into a respective optical attenuator 22a or 22b. The optical attenuators 22a and 22b in this example are manually settable by a user to enable the user to adjust the output intensity of the optical signal after each attenuator 22a and 22b. The manually adjustable attenuators 22a and 22b are widely commercially available. In one embodiment the optical attenuators 22a and 22b may take the form of neutral density filters. The attenuators 22a and 22b enable the user to control the ratio of intensities of the optical signals being output from the two filters 18a and 18b. This ratio of intensity over the two spectral bands of interest defines the black body temperature being simulated. Alternatively, the attenuators 22a and 22b could be selected to enable automatic control by the processor 20, assuming the processor is included in the apparatus 10. The first iris 16a, first bandpass filter 18a and first attenuator 22a may be viewed as a first signal processing subsystem 19a, while the second iris 16b, the second bandpass filter 18b and the attenuator 22b may be viewed as forming a second signal processing subsystem 19b.

The optical signal output from each attenuator 22a and 22b is output to an input of a beam cube 24. The beam cube 24 combines the two optical signals to produce the final spectrum as first output optical signal, represented by arrow 24a, and second output optical signal, represented by arrow 24b. The beam cube outputs 50% of the combined optical signals as the first output optical signal 24a in a first direction, and 50% of the combined optical signals as a second output optical signal 24b in a second direction. In this example the first output optical signal 24a is not used. The second output optical signal represented by its associated arrow 24b may be directed at a detector (not shown) being calibrated, as will be explained further in the following paragraphs. Optionally, a small portion of the second output optical signal represented by arrow 24b may be received (i.e., "picked off") by an optional photodetector 26 to provide a feedback signal to an optional spectrometer 28. The spectrometer 28 provides a signal to the processor 20 representative of the signal spectrum of the optical signal being received by the photodetector 26. The processor 20 may monitor the signal from the spectrometer 28 and use this signal to make adjustments to the filters 18a and 18b, as well as possibly to the attenuators 22a and 22b.

The overall light output represented by the arrow 24b may be controlled by modulating the intensity of the lamp 12, and can be adjusted upwards or downwards depending on the sensitivity of the detector being calibrated. The bands over which the black body spectrum is simulated are controlled by the bandpass filters 18a and 18b, for example manually by the user if manually adjustable filter wheels are being used for the filters bandpass 18a and 18b. This enables the user to vary the spectral region as needed to select a specific spectral region for calibrating the external detector (not shown).

Testing of the apparatus 10 was performed with the bandpass filter 18a centered at 800 nm (40 Full Width Half Maximum, or "FWHM"), 825 nm (25 FWHM), and 850 nm (40 FWHM), and with the filter 18b centered on 850 (40 FWHM) nm, 850 (25 FWHM) nm, and 880 (40 FWHM) nm. The apparent temperature varies by changing the ratio in intensities between the two spectral regions according to the following Equation 1:

$$R(T) = \frac{\int_{\lambda_1}^{\lambda_2} \frac{2hc^2}{\lambda^5} \left( e^{\frac{hc}{\lambda k_B T}} - 1 \right)^{-1} d\lambda}{\int_{\lambda_2}^{\lambda_1} \frac{2hc^2}{\lambda^5} \left( e^{\frac{hc}{\lambda k_B T}} - 1 \right)^{-1} d\lambda} \qquad \text{Equation 1}$$

where "R" is the ratio of intensities between the two spectral bands, "T" is temperature, "h" is the Planck constant, "c" is the speed of light, "$k_B$" is Boltzmann's constant, and "λ" represents wavelength, with the two spectral regions of interest as defined by the two bandpass filters 18a and 18b encompassing the wavelength range between $\lambda_1$ and $\lambda_2$ (for bandpass filter 18a) and the wavelength range between $\lambda_3$ and $\lambda_4$ (for bandpass filter 18b). The ratio between the two bands is changed using the optical attenuators 22a and 22b to independently alter the intensity of each band, thus allowing the ratio between the two bands to be set to any arbitrary value. This allows calibration of a two-band thermal imager over an arbitrary temperature range. However, for most practical applications using the above mentioned wavelength bands, the intensity ratio is between approximately 0.5 and 1.5.

Figure 2:
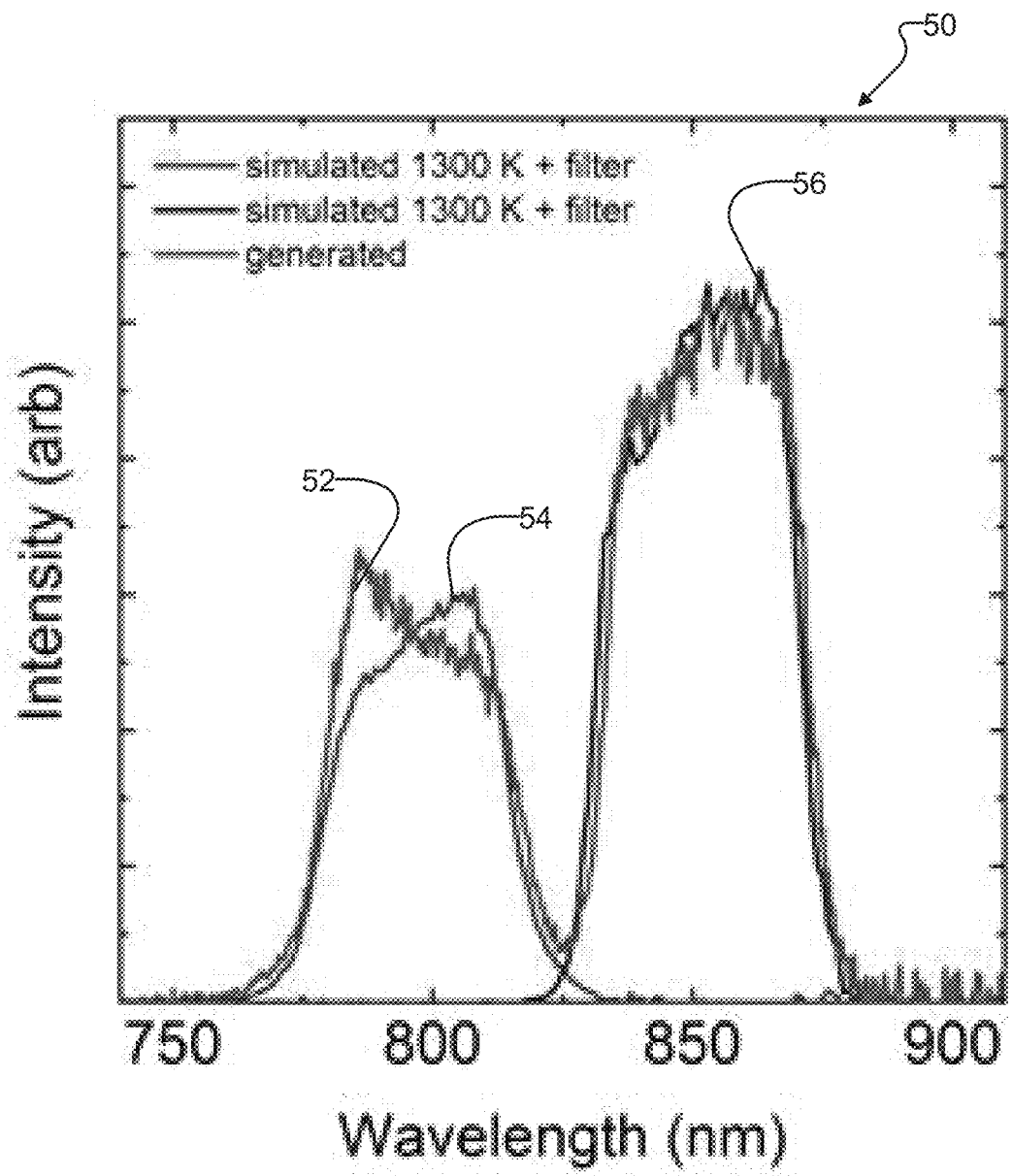
FIG. 2 is a graph showing a plurality of signal spectrum curves showing how the apparatus of FIG. 1 is able to closely simulate an actual black body signal spectrum.

FIG. 2 illustrates a graph 50 showing a true black body curve over the spectral regions of interest 54 and 56, the curve produced by the black body simulator described here. Thus, curves 54 and 56 combined are the black body signal spectrum that the apparatus 10 is attempting to simulate with its optical signal output represented by optical signal arrow 24b in FIG. 1. Curve 52 represents a simulated black body spectrum produced by the apparatus 10 at optical signal arrow 24b. As should be apparent, the signal spectrums represented by curves 54 and 56 closely parallel the curve 52.

Figure 3:
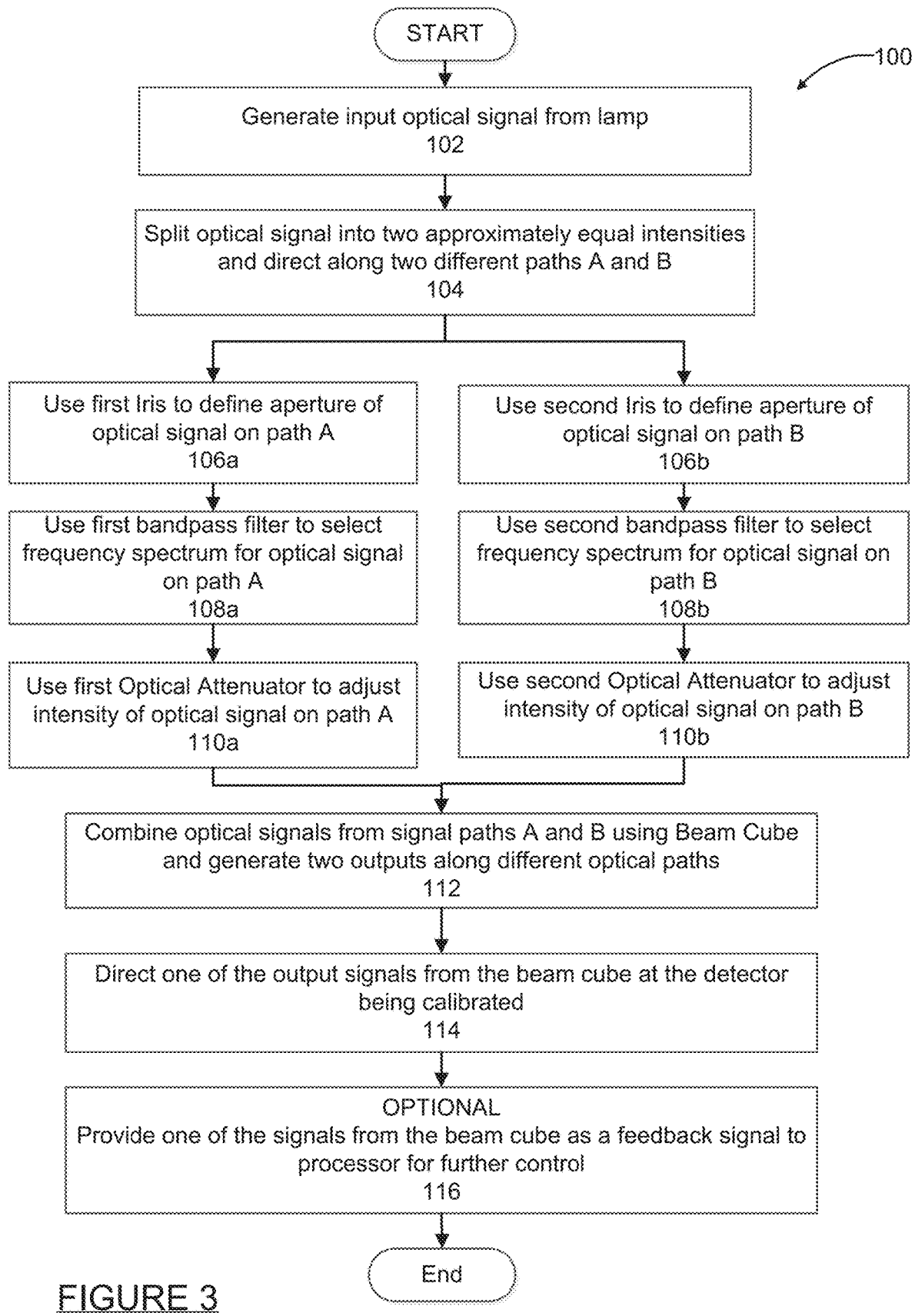
FIG. 3 is a high level flowchart illustrating various operations performed by the apparatus of FIG. 1 in producing the user selected black body signal spectrum.

FIG. 3 is a high level flowchart 100 illustrating various operations that may be performed by the apparatus 10 of FIG. 1. Initially the lamp 12 generates an input optical signal as indicated at operation 102. At operation 104 the input optical signal is split by the light guide 14 into two approximately equal intensities and directed along two different optical paths A and B. At operations 106a and 106b the irises 16a and 16b are used to define the aperture of each of the two optical signals to desired diameters. At operations 108a and 108b first and second bandpass filters (filters 18a and 18b) are selected by the user to select two different frequency spectrums for the optical signals travelling on the two optical paths. At operations 110 and 110b first and second optical attenuators (e.g., optical attenuators 22a and 22b in FIG. 1) may be adjusted by the user to adjust the intensity of the filtered optical signal travelling along each of optical paths A and B. At operation 112, the two filtered, intensity-adjusted optical signals are then combined, for example using the beam cube 24, and directed out along two different optical paths. At operation 114 one of the two optical signals from the beam cube 24 is directed at the detector being calibrated. At operation 116, which is optional, the optical signal being directed at the detector being calibrated may be partially imaged or "picked off" by a separate feedback detector, such as photodetector 26 (FIG. 1), and used by a separate spectrometer and processor (e.g., spectrometer 28 and processor 20 of FIG. 1) for automated control of the outputs from the beam cube 24.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that the present disclosure is thorough and fully conveys its intended scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An apparatus for simulating a black body spectrum, comprising:
   a broadband light source;
   a light guide configured to receive white light generated by the broadband light source and generating first and second optical signals;
   a first signal processing subsystem for enabling independent adjustments of both a signal spectrum and an intensity of the first optical signal;
   a second signal processing subsystem for enabling independent adjustments of both a signal spectrum and an intensity of the second optical signal; and
   a beam cube configured to combine the first and second optical signals to produce a final light output signal having a desired signal spectrum and a desired intensity.

2. The apparatus of claim 1, wherein the broadband light source comprises a broadband white light source.

3. The apparatus of claim 1, wherein the broadband light source comprises a quartz tungsten halogen lamp.

4. The apparatus of claim 1, wherein the first and second signal processing subsystems each comprise an iris for focusing the first and second light outputs.

5. The apparatus of claim 1, wherein the first and second signal processing subsystems each comprise a filter for independently adjusting a spectrum of each of the first and optical signals.

6. The apparatus of claim 5, wherein each said filter comprises a wheel filter.

7. The apparatus of claim 1, wherein each of the first and second signal processing subsystem comprises an adjustable optical signal attenuator.

8. The apparatus of claim 7, wherein each said adjustable optical signal attenuator comprises a neutral density filter.

9. The apparatus of claim 1, wherein an apparent temperature of the final light output signal is controlled by changing a ratio in intensities between the first and second optical signals in accordance with an equation:

$$R(T) = \frac{\int_{\lambda_1}^{\lambda_2} \frac{2hc^2}{\lambda^5} \left( e^{\frac{hc}{\lambda k_B T}} - 1 \right)^{-1} d\lambda}{\int_{\lambda_2}^{\lambda_1} \frac{2hc^2}{\lambda^5} \left( e^{\frac{hc}{\lambda k_B T}} - 1 \right)^{-1} d\lambda}$$

where "R" is the ratio of intensities between the spectral bands of the first and second optical signals, "T" is temperature, "h" is the Planck constant, "c" is the speed of light, "$k_B$" is a Boltzmann's constant, and "$\lambda$" represents wavelength, with two spectral regions of interest defined by first and second bandpass filters in the first and second signal processing subsystems, respectively, which produce frequency spectra $\lambda_1$-$\lambda_2$ and $\lambda_3$-$\lambda_4$, respectively.

10. The apparatus of claim 1, further comprising an electronic processor for controlling at least one component of each of the first and second signal processing subsystems.

11. A multi-band black body simulating apparatus, the apparatus comprising:
    a broadband light source;
    a light guide configured to receive light generated by the broadband light source and generating first and second optical signals;
    a first signal processing subsystem for enabling separate, independent adjustments of both a signal spectrum and an intensity of the first optical signal, the first signal processing subsystem including:
       a first bandpass filter; and
       a first adjustable optical attenuator;
    a second signal processing subsystem for enabling separate, independent adjustments of both a signal spectrum and an intensity of the second optical signal, the second signal processing subsystem including:
       a second bandpass filter; and
       a second adjustable optical attenuator;
    a beam cube configured to combine the first and second optical signals received from the first and second signal processing subsystems to produce a final light output signal.

12. The apparatus of claim 11, wherein each of the first and second bandpass filters comprises a filter wheel.

13. The apparatus of claim 12, wherein
    the first bandpass filter is centered at least at one of:
       800 nm (40 Full Width Half Maximum (FWHM));
       825 nm (25 FWHM); and
       850 nm (40 FHWM);
    and wherein the second bandpass filter is centered at least at one of:
       850 nm (40 FWHM);
       850 nm (25 FWHM); and
       880 nm (40 FWHM).

14. The apparatus of claim 11, wherein the first and second adjustable optical attenuators comprise first and second adjustable neutral density filters.

15. The apparatus of claim 11, further comprising a controller configured to monitor and control the adjustable optical attenuators.

16. The apparatus of claim 11, further comprising a controller configured to monitor and control the bandpass filters.

17. The apparatus of claim 11, further comprising a controller configured to monitor and control the bandpass filters and the adjustable optical attenuators.

18. The apparatus of claim 11, wherein the light source comprises a quartz tungsten halogen lamp.

19. A method for simulating a black body, the method comprising:
    using a broadband light source to generate broadband light;
    using a light guide to receive the broadband light and to generate first and second optical signals;
    using a first signal processing subsystem to receive the first optical signal and to enable independent user adjustments of both a signal spectrum and an intensity of the first optical signal;
    using a second signal processing subsystem to receive the second optical signal and to enable independent user adjustments of both a signal spectrum and an intensity of the second optical signal; and
    using a beam cube configured to combine the first and second optical signals to produce a final light output signal having a desired signal spectrum and a desired intensity.

20. The method of claim 19, wherein:
    using a first signal processing subsystem comprises using a first user adjustable bandpass filter and a first adjustable optical attenuator; and
    using a second signal processing subsystem comprises using a second user adjustable bandpass filter wheel and a second adjustable optical attenuator.

21. The method of claim 19, further comprising using an electronic processor to control the first and second signal processing subsystems.

\* \* \* \* \*